United States Patent [19]

Pedersen

[11] Patent Number: 4,929,398
[45] Date of Patent: May 29, 1990

[54] TOWER PACKING CARTRIDGE

[76] Inventor: George C. Pedersen, Box 570846, Perrine, Fla. 33157

[21] Appl. No.: 330,223

[22] Filed: Mar. 29, 1989

[51] Int. Cl.⁵ .............................................. B01F 3/04
[52] U.S. Cl. ............................ 261/94; 261/DIG. 72; 55/489
[58] Field of Search ........................ 261/94, DIG. 72; 428/116; 55/257.1, 489

[56] References Cited

U.S. PATENT DOCUMENTS

| | | | |
|---|---|---|---|
| 2,047,444 | 7/1936 | Stedman | 261/94 |
| 2,630,305 | 3/1953 | Scofield et al. | 261/94 |
| 3,243,170 | 3/1966 | Ellis et al. | 261/94 |
| 3,285,587 | 11/1966 | Huber | 261/112.2 |
| 3,905,788 | 9/1975 | Alliger | 55/489 |
| 4,022,596 | 5/1977 | Pedersen | 261/94 |
| 4,303,600 | 12/1981 | Roe, Jr. | 261/94 |
| 4,604,247 | 8/1986 | Chen et al. | 261/94 |

Primary Examiner—Tim Miles
Attorney, Agent, or Firm—Schweitzer & Cornman

[57] ABSTRACT

A tower packing cartridge is formed of strips of fabric-like material placed in face-to-face contact such that the planes of the strips are parallel to the general flow direction through the cartridge. The fabric-like material is formed of generally straight, relatively stiff strands of mono-filament material, arranged in a repeating pattern which is preferably generally triangular in cross section in both directions. The construction provides a substantially non-nestable structure when strips are placed in face-to-face contact, such that the cartridge has an extremely high void fraction. The fabric-like material, in itself known, when assembled in this manner, achieves unique and surprising results in relation to exceptional uniformity of flow distribution across the entire face of the cartridge while at the same time maintaining extremely high void fraction to keep energy losses at a minimum during operation.

10 Claims, 2 Drawing Sheets

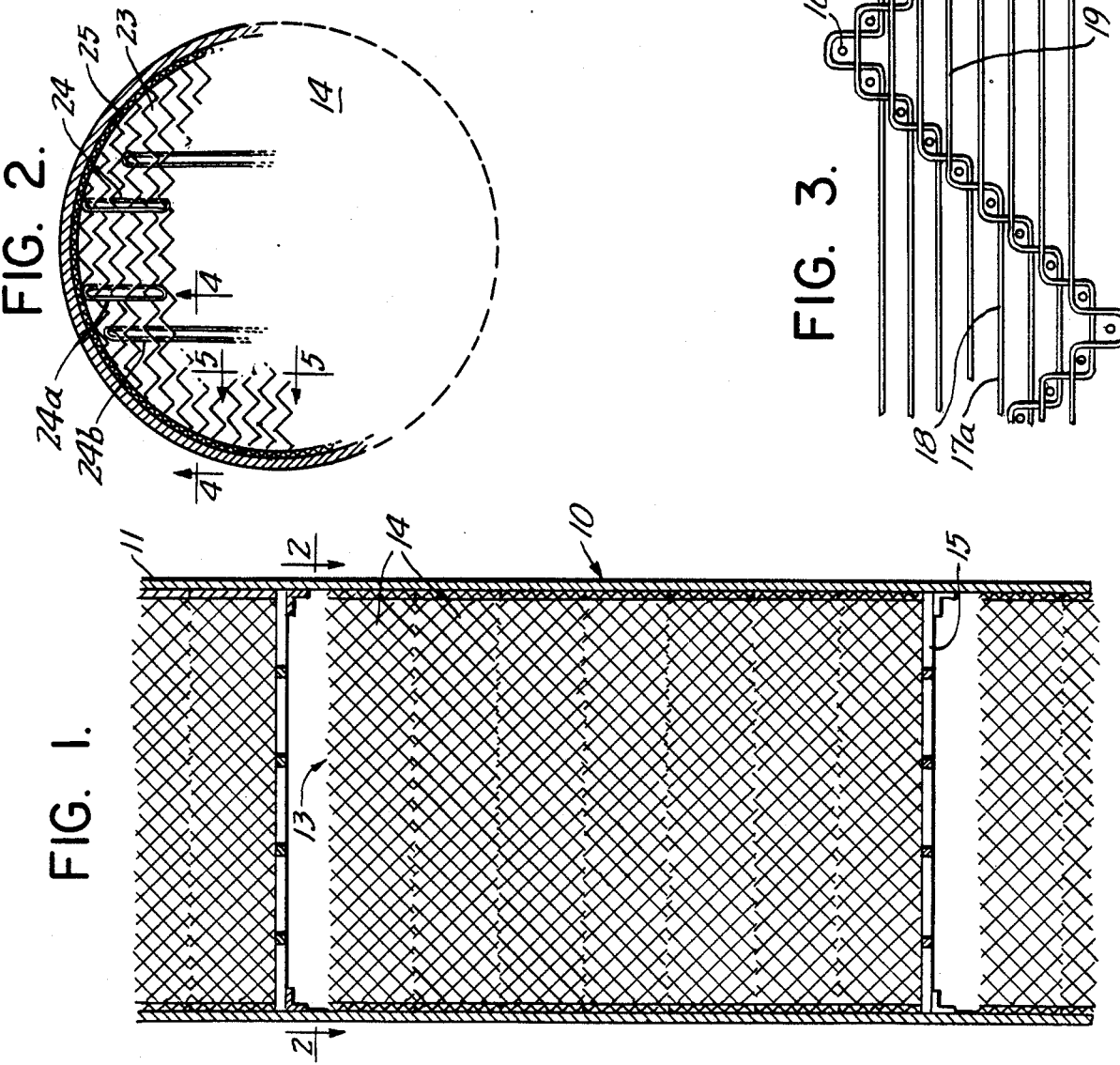

TOWER PACKING CARTRIDGE

BACKGROUND AND SUMMARY OF THE INVENTION

Many industrial operations, including chemical processing, gas stream cleansing and the like make use of so-called exchange columns or exchange towers.

For certain applications, processing towers are provided with layers of packing material and arrangements are made for the counterflow through the tower of gas, in one direction, and liquid medium, in the other direction. The packing material is designed to provide for an optimum degree of contact between the counterflowing fluids so that, for example, a particular component of the gas stream may be absorbed into the counterflowing liquid stream.

As will be readily understood, achieving optimum characteristics for the packing material requires the efficient balancing of two somewhat mutually inconsistent characteristics. Thus, on the one hand, it is desired for the gas and liquid to have maximum surface contact with each other, which in turn involves the breaking up of the fluid flow into a maximum number of individual flow paths. At the same time, it is important to minimize resistance to the flow of fluid through the treating tower, so as to avoid excessive energy usage in the conducting of the tower processing operations.

A uniquely advantageous material for use in mist elimination and tower packing applications is described and claimed in U.S. Pat. No. 4,022,596, granted to George C. Pedersen. The Pedersen patent discloses a fabric-like material of a special woven construction, arranged to have a relatively deep waffle-like configuration and in which the individual strands of the woven structure establish a uniquely optimized flow path. Conventionally, the material of the Pedersen patent has been used in layers, oriented across the direction of flow through the processing tower, so that all strands of the material are oriented at 90% to the general direction of fluid flow through the tower. The packing material of the Pedersen patent has enjoyed a high degree of commercial success and is one of the premier products currently available for this purpose.

Notwithstanding the highly optimized characteristics of the packing material of the Pedersen patent, the present invention enables markedly and surprisingly superior results to be achieved in the use of the material of the Pedersen patent, and, indeed, in the use of materials which, while possibly outside the scope of the Pedersen patent, and not incorporating all of its inventive features, are otherwise constructed in a manner to have predetermined related characteristics, to be described further herein.

One of the significantly advantageous characteristics of the material of the Pedersen patent is its extremely high void fraction, consistently above 80% and more typically above 90%, which provides minimum resistance to countercurrent fluid flow through a processing tower, thus minimizing energy usage to create the necessary flow conditions. A concomitant of such high void fraction, however, is the possibility of channeling of the fluid flow to the packing cartridges. That is, a tendency for the fluid flow to concentrate in certain areas, and not utilizing the entire area of the cartridge as uniformly as desired.

The present invention involves a reorientation of the fabric-like material such that the monofilament strands of which it is constructed, originally contemplated to be oriented at 90° to the fluid flow, are reoriented by stacking the fabric-like material on edge, rather than flat. In one particularly preferred embodiment, sections of the fabric are slit into strips, at approximately 45° to the strand orientation (referred to as 45/45 orientation). When the strip-like sections are placed on edge, all of the strands are oriented at approximately 45° to the direction of fluid flow. This is shown to have a remarkable and surprising effect in terms of distributing the fluid flow in a highly uniform manner over the whole surface area of the cartridge. Important advantages can also be achieved with the strip-like sections cut at different angles, even as far as parallel to one set of the strands (referred to as a 90-0 orientation). In this arrangement, one set of strands is parallel to the fluid flow, while the other is at 90° thereto.

Pursuant to the invention, a tower packing cartridge is formed by slitting or otherwise preparing fabric-like material of predetermined characteristics into relatively narrow, strip-like sections, which are placed on edge and assembled in face-to-face contact. Among other characteristics of the material is that it is substantially non-nestable, so that the assembled packing cartridge retains substantially the extremely high void fraction of the fabric itself.

While it is known to orient fabric-like packing material on edge, for example in the Ellis, et al. U.S. Pat. No. 3,243,170, the benefits thereof are not evident in or realized by the structure of the Ellis, et al. patent, because it utilizes a knitted fabric structure, in which the yarn strands are effectively randomly oriented, because of the loop structure of the knitted stitches. Indeed, in the arrangement of the Ellis et al. patent, knitted material is crimped and then doubled back and forth upon itself, so that the crimping lines of two adjacent faces cross each other. This perhaps is intended to emulate known corrugated structures, such as shown in the Huber U.S. Pat. No. 3,285,587, for example, in which packing material is made up of an assemblage of corrugated plates, with adjacent sets of corrugations being inclined in opposite directions.

For a more complete understanding of the above and other features and advantages of the invention, reference should be made to the following detailed description of a preferred embodiment and to the accompanying drawings.

DESCRIPTION OF THE DRAWING

FIG. 1 is a longitudinal cross sectional view through a processing tower containing tower packing cartridges constructed in accordance with the invention.

FIG. 2 is a fragmentary cross sectional view as taken generally on line 2—2 of FIG. 1.

FIG. 3 is a greatly enlarged, cross sectional view illustrating the construction of the fabric-like material preferentially used in the cartridge of the invention.

FIG. 4 is a fragmentary cross sectional view as taken generally on line 4—4 of FIG. 2 illustrating a preferred orientation of monofilament strands in the tower packing cartridge.

FIG. 4a is a view, similar to FIG. 4, illustrating an alternative orientation of strands.

FIG. 5 is a fragmentary cross sectional view as taken generally on line 5—5 of FIG. 2, illustrating the non-nesting characteristics of the fabric-like material incorporated in the cartridges.

DESCRIPTION OF A PREFERRED EMBODIMENT

Figure 6:
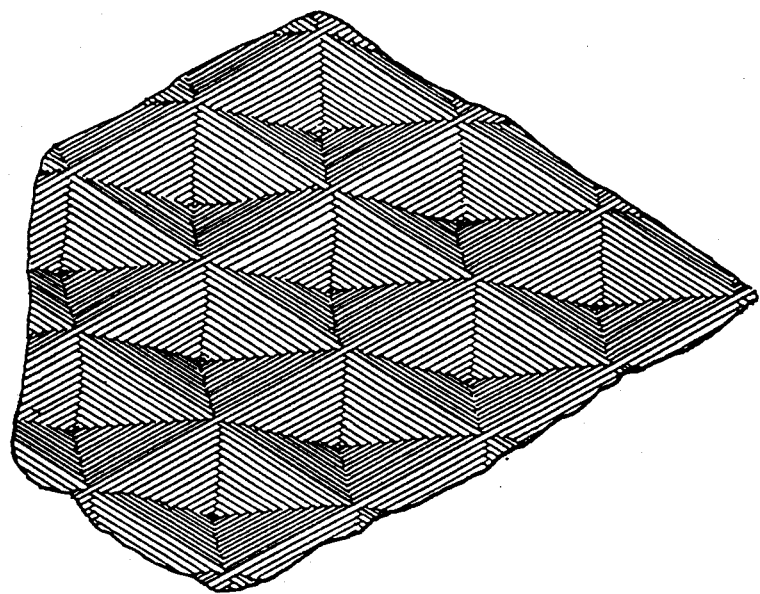
FIG. 6 is a simplified perspective illustration of a preferred form of fabric-like material, of a special woven construction, as described in the above mentioned Pedersen U.S. Pat. No. 4,022,596.
Figure 7:
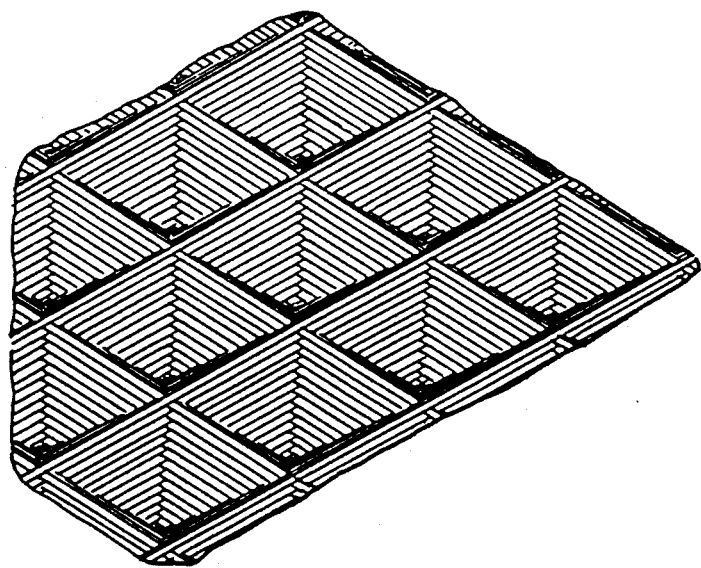
FIG. 7 is a perspective view, similar to FIG. 6, illustrating the fabric of FIG. 6 after treatment to optimize and deepen the waffle-like configuration of the fabric-like structure.

Referring now to the drawing, the reference numeral 10 designates in a general way a processing tower of conventional construction. The tower includes an elongated cylindrical wall 11 provided with means (not shown) for introduction of a liquid at the top, and a gas at the bottom. The two fluids are caused to flow in countercurrent relation through the elongated tower. An internal tower packing material, generally designated by the numeral 13, causes the fluid flow to be divided and turbulent and provides for a relatively high degree of fluid contact, to promote a desired interchange between the two fluids.

Typically, the tower packing may be in the form of a plurality of individual cartridges 14 stacked in groups on supports 15 provided internally in the tower. Customarily, the cartridges 14 are of the size and shape of the interior configuration of the tower 10. In the case of the illustrated tower, the cartridges 14 are of circular configuration.

Preferentially, the material of which the cartridges 14 are formed is constructed according to the Pedersen U.S. Pat. No. 4,022,596, the disclosure of which is hereby incorporated by reference. The basic material is a fabric-like material, an idealized form of which is illustrated in FIG. 3. It is formed of strands, preferably of monofilament material and typically but not necessarily of a thermoplastic material. For some applications, metallic strands may be preferred.

Pursuant to the disclosure of the Pedersen patent, the fabric-like material is made up of a first set of strands 16 extending in parallel fashion in one predetermined direction and being substantially straight throughout their length. The strands 16 of the first set are arranged in a repeating pattern, preferably of a saw-tooth cross sectional configuration, such that the thickness of the fabric is defined by the space between the uppermost strand 16a and the lowermost strand 16b. This thickness dimension is a substantial multiple —depending upon the number of the "repeat", but typically greater than ten — of the diameter of the individual strands 16 of the first set.

A second set of strands 17 extends at right angles to the first and is similarly arranged to have a generally sawtooth cross sectional configuration. Where the strands of the second set 17 intersect with the strands of the first set, a strand 17 passes between two of the strands 16 and the is redirected at a sharp angle to pass around the next adjacent strand 16. The strand 17 is then redirected parallel to its original direction, which is parallel to the "plane" of the fabric structure generally, until the strand 17 again intersects with and passes between two of the strands 16. Upon passing between two sets of strands, the strand 17 is redirected to pass around the next adjacent strand 16, after which the strand 17 is again directed in its original plane until it intersects with a subsequent group of strands 16 from the first set.

In the idealized construction shown in FIG. 3, the strands 16 of the first set are substantially straight throughout their length. The strands 17, extending at right angles thereto, are arranged in substantially straight segments, which are alternately offset. Thus, with reference to FIG. 3, a particular strand 17a typically will have a first portion 18, extending straight in the "plane" of the fabric structure. The section 18 joins with a section 19 which, in the illustrated construction, is offset three strand thicknesses upwardly, but extends parallel to it. The section 19 is in turn connected to a section 20, which is generally coaxial with the section 18. A further section 21 is substantially coaxial with the section 19 and, of course, this pattern repeats throughout the length of the strand.

Typically but not necessarily, the fabric-like material illustrated in FIG. 3 is constructed utilizing thermoplastic monofilament strands, with the relatively straight strands 16 comprising weft strands, and the strands 17 comprising the warp. After the initial construction, a treatment procedure is carried out, during which the weft strands 16 are held under sufficient tension to maintain their relative straightness.

As will be appreciated, although the fabric-like material illustrated in FIG. 3 has a waffle-like structure, with deep void-forming pockets 22, the fabric is substantially non-nestable with layers of like fabric, because of the fact that the strands 16, 17 extend substantially straight through the fabric. The strands 16 at the surface of one layer of material will contact strands 17 of an adjacent contacting layer, running at 90° thereto. This effectively prevents nesting regardless of how one section registers with respect to its neighbor (see FIG. 5).

In the uses of the fabric contemplated by the Pedersen U.S. Pat. No. 4,022,596, it was intended that all of the yarns of the fabric-like material would be disposed at right angles to the general flow of fluid through the processing tower. To this end, it has been practiced in the past to form the fabric-like material in relatively wide web form and to cut the web material into the shape desired for crosswise installation in the tower. For a cylindrical tower, the fabric-like material conventionally would be cut into circular form, and a packing cartridge would be constructed by stacking a plurality of circular sections one upon the other. I have now discovered, however, that surprising and unexpected, and highly advantageous results are achieved if, instead of conventionally orienting the fabric-like material at right angles to the direction of fluid flow through the tower, the material is oriented on edge, so that the general direction of fluid flow is through the width direction, rather than through the thickness direction of the material. To this end, the fabric-like material is formed in strips of appropriate lengths and widths, and a packing cartridge is formed by assembling a plurality of strips, on edge, in face-to-face contact. Typically, the strips are all oriented to face the same way but that is not critical because the fabric is substantially reversible in its construction In a representative example of a tower packing cartridge constructed in accordance with the invention, strips of the fabric-like material are formed in width of about six inches, typically by slitting of strip-like sections from a larger web of material. By properly graduating the length of the strip-like sections, a plurality of such sections 23 (see FIG. 2) may be assembled in face-to-face contact to form the desired circular peripheral contour. In the arrangement illustrated in FIG. 2, a plurality of sections may be bound together by lateral tie strands 24, which extend through the cartridge, or portions of the cartridge, in order to secure all of the sections 23 together as a unitary cartridge of the desired size and shape. Desirably, the thus configured cartridge is provided with a peripheral wrapping 25 comprising a plurality (typically two) of layers of a material of similar construction to the principal fabric-like material but of smaller diameter strands. The material of the peripheral wrapping 25 typically may be of a style such as 8/96 polypropylene, utilizing monofilament polypropylene yarns of 8 mil diameter, constructed to provide a void fraction of 96/&. The peripheral wrapping provides a somewhat conformable intermediate layer to seal closely against the inner wall of the tower 10.

In one representative example, a plurality of striplike sections 23 of 16/83 style material, formed of high temperature polypropylene, is slit into strips six inches in width. The direction of the slit was such that the strands 16, 17 both were oriented at an angle of about 45° to the edges of the strip, a configuration sometimes referred to herein as 45/45. The reference 16/83 refers to the use of strands 16 mils in diameter, constructed to provide a void fraction of at least 83%. Typically, a fabric of this construction may have an overall thickness of at least about 3/32 seconds of an inch because of the saw-tooth cross sectional configuration of the yarns, as reflected in FIG. 3, and a sufficient number of strips of such material is placed in face-to-face contact to form a cartridge of, for example, 24 inches in diameter. The individual strips are held together with the lateral ties 24, in sufficient number and placement to retain the strips in their assembled relation. In many cases, the diameter of the cartridge 14 may be such as to make it impractical to extend the tie yarns 24 entirely through the cartridge, to engage the entire stack of individual strips 23. In such cases, individual subgroups of the stacked strips may be secured together by short tie yarns 24, as reflected at 24a in FIG. 2, and the subgroups in turn are secured together by other sets of tie yarns, as reflected at 24b.

As will be readily understood, the construction of the fabric-like material may vary widely as a function of the process to be performed in the tower. In another commercially utilized form of the material, for example, a 37/94 polypropylene style is called for, in which the fabric is constructed of 37 mil polypropylene monofilament to have a thickness of approximately one half inch. The thickness of the fabric is, of course, a function of the number of yarns in a repeat of the saw-tooth cross sectional configuration, as will be readily evident in the structure of FIG. 3.

In FIG. 4 of the drawing, there is a cross sectional illustration as taken on line 4—4 of FIG. 2, substantially between two face-to-face sections of the fabric-like material 23. In the version of FIG. 4, which is a preferred version for most purposes, the strip sections 23 are cut on a 45° bias from the fabric material as originally constructed such that the yarns 16, 17 extend at 45° to the upper and lower edges of the fabric strip. This arrangement is unexpectedly and remarkably effective in distributing the liquid flow descending through the tower in a highly uniform manner over the entire surface of the packing cartridge, with attendant significant improvement in the efficiency of the transfer operations taking place within the tower. In this respect, a more effective distribution of the liquid over the entire cross section of the packing material assures a more effective contacting of the liquid with the upflowing gases, in order to more effectively achieve the desired exchange action between the counterflowing fluids.

In the modified version indicated in FIG. 4a, the construction of the basic fabric-like material is the same, except that the strip sections 23 are formed so that the yarns 16, 17 run generally vertically and horizontally in relation to the tower. The configuration of FIG. 4a, while realizing at least some of the beneficial characteristics of the strip material of FIG. 4, is somewhat more efficient with respect to the use of material, inasmuch as the cutting of the material on the bias necessarily results in some wastage of the material at the edges. It is of course within the contemplation of the invention that the orientation of the strands 16, 17 in the strip sections 23 may be provided in a 45/45 orientation, as shown in FIG. 4, a 90/0 orientation, as shown in FIG. 4a, or in any orientation in between that might be considered advantageous for a particular purpose, it being understood that, in general, the two sets of strands 16, 17 will in all cases be oriented at 90° to each other.

In any of its various configurations, the tower packing material of the invention achieves surprising and unexpected improvements in the efficiency of the tower exchange operations which can be performed. Especially when utilizing a high void fraction material, such as described in the Pedersen U.S. Pat. No. 4,022,596, the flow of liquid through the tower needs such a lower level of resistance (in itself a highly desirable characteristic) there can be a tendency for the fluid flow to channel in certain areas of the packing material. With the tower packing material of the present invention, however, utilizing material such as that of the Pedersen patent, but oriented on edge instead of transversely to the fluid flow, the advantages of the fluid flow may be realized while at the same time assuring highly effective distribution of that flow across the full area of the packing material. And, although the prior art contains illustration of materials mounted on edge, such as in the Ellis et al. U.S. Patent previously mentioned, and in the wide variety of corrugated sheet materials used in such applications, the extraordinary advantages of the high void fraction, fabric-like material of the earlier Pedersen patent are not realized in these prior art proposals. By the same token, the material of the Pedersen patent was contemplated to be oriented in layers transverse to the flow of fluid, so that all of the individual strands of the material, when positioned for use, would be essentially perpendicular to the fluid flow being treated It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A cartridge of tower packing material, for installation in an axially elongated processing tower having flow passage means, which comprises
    (a) a plurality of strip-like sections of high bulk, high void fraction filamentary fabric-like material,
    (b) said strip-like sections being arranged in face-to-face contact, and being assembled in sufficient number and of such length as to form a cartridge of predetermined cross section for close reception in a flow passage of said processing tower,
    (c) said fabric-like material being of a waffle-weave construction comprising a first set of generally parallel strands extending in substantially straight fashion in one predetermined direction and a second set of strands extending at right angles to said predetermined direction,
(d) each repeating group of strands of said first set being arranged in a generally saw-tooth cross sectional configuration whereby the thickness of said fabric-like material is substantially equal to the height of said saw-tooth cross sectional configuration,
(e) each repeating group of strands of said second set being arranged in a generally saw-tooth cross sectional configuration intersecting at right angles with the strands of said first set,
(f) the intersecting strands of saw-tooth configuration forming a substantially non-nestable waffle-weave construction, whereby a plurality of layers of the material may be assembled in face-to-face contact without significant reduction in the void fraction of the assembled layers in relation to the individual layers, and providing a void fraction of the assembled, contacting layers of at least about 80%,
(g) said strip-like sections being set on edge in said cartridge, with said strands lying generally in planes parallel to the general direction of fluid flow through the passage in which said cartridge is installed.

2. A cartridge of packing material according to claim 1, further characterized by,
(a) said fabric-like material being constructed in widths substantially greater than the width of said strip-like sections and being cut to the width of said sections.

3. A cartridge of packing material according to claim 2, further characterized by,
(a) said strip-like sections being cut at an angle of less than 90 to the strands of one set.

4. A cartridge of packing material according to claim 3, further characterized by,
(a) said strip-like sections being cut at an angle of about 45 to the direction of said strands.

5. A cartridge of packing material according to claim 1, further characterized by,
(a) said cartridge including a plurality of strip-like layers of edge wrap material, wrapped about the periphery of said cartridge and serving in part to confine said strip-like sections and in part to form a seal between the edges of said cartridge and the walls of said flow passage,
(b) said edge wrap material being generally of the same construction as said strip-like sections but formed of strands of substantially smaller diameter, whereby said edge wrap material has a relatively high degree of flexibility and conformability.

6. A cartridge of packing material according to claim 1, further characterized by,
(a) said cartridge comprising a predetermined plurality of strip-like sections arranged in face-to-face contacting relation,
(b) groups of said strip-like sections, less than said predetermined number plurality thereof, being secured together by laterally extending tie elements.

7. A cartridge of packing material according to claim 1, further characterized by,
(a) the strands of at least said second set being formed of a thermoplastic material,
(b) the strands of said second set, at the points of intersection thereof with the strands of said first set, being directed through a pair of equal and opposite turns and extending thereafter in a parallel but offset path.

8. A cartridge of tower packing material or the like, for installation in an axially elongated processing tower having flow passage means, which comprises
(a) a plurality of strip-like sections of high bulk, high void fraction filamentary fabric-like material,
(b) said strip-like sections being arranged in face-to-face contact, and being assembled in sufficient number and of such length as to form a cartridge of predetermined cross section for close reception in a flow passage of said processing tower,
(c) said fabric-like material comprising a first set of generally parallel strands extending in substantially straight fashion in one predetermined direction and a second set of strands extending at right angles to said predetermined direction,
(d) the strands of said first set being arranged in a 16 repeating two-dimensional cross sectional geometric pattern in which strands at the extremes of said pattern define a fabric thickness which is a multiple of at least about 10 of the diameter of a strand,
(e) the strands of the second set also being arranged in a repeating two-dimensional cross sectional geometric pattern intersecting with the strands of said first set,
(f) the strands of said second set, at the extremes of the geometric pattern thereof, additionally defining a fabric thickness which is a multiple of at least about 10 of the diameter of a strand,
(g) the strands of said second set extending in substantially straight manner in the regions between contact with strands of the first set,
(h) the intersecting strands of said first and second sets forming a substantially non-nestable construction having a void fraction of at least about 80%,
(i) said strip-like sections being set on edge in said cartridge, with said strands lying generally in planes parallel to the general direction of fluid flow through the passage in which said cartridge is installed.

9. A cartridge of packing material according to claim 8, further characterized by,
(a) said cartridge having spaced front and back faces defining generally parallel planes,
(b) the strands of said first set lying generally at a first angle to said front and back faces and the strands of said second set lying generally at a second angle to said front and back faces,
(c) the sum of said first and second angles being substantially 90.

10. A cartridge of packing material according to claim 8, further characterized by,
(a) said cartridge having a peripheral wrapping,
(b) said peripheral wrapping being of a fabric-like material constructed substantially in accordance with fabric construction defined in claim 8 but using strands of substantially smaller diameter to provide a structure of greater flexibility and pliability,
(c) said peripheral wrapping providing a conformable interface between the end edges of said strip-like sections and the interior walls of said passages.

* * * * *